United States Patent
McMillan et al.

(10) Patent No.: US 11,275,847 B2
(45) Date of Patent: Mar. 15, 2022

(54) TECHNOLOGIES FOR USER-MODE PERSISTENCE OF CERTIFICATES AND KEYS IN RESOURCE-CONSTRAINED DEVICES

(71) Applicant: INTEL CORPORATION, Santa Clara, CA (US)

(72) Inventors: Alexander R. McMillan, Chandler, AZ (US); Deloy P. Bitner, Glendale, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 359 days.

(21) Appl. No.: 16/326,836

(22) PCT Filed: Sep. 21, 2016

(86) PCT No.: PCT/US2016/052763
§ 371 (c)(1),
(2) Date: Feb. 20, 2019

(87) PCT Pub. No.: WO2018/056962
PCT Pub. Date: Mar. 29, 2018

(65) Prior Publication Data
US 2019/0228165 A1   Jul. 25, 2019

(51) Int. Cl.
*G06F 21/60* (2013.01)
*H04L 9/08* (2006.01)
*H04L 9/32* (2006.01)

(52) U.S. Cl.
CPC .......... *G06F 21/602* (2013.01); *H04L 9/0894* (2013.01); *H04L 9/3226* (2013.01);
(Continued)

(58) Field of Classification Search
CPC .......... G06F 21/602; G06F 2221/2107; H04L 9/0894; H04L 9/3226; H04L 2209/046; H04L 2209/16
See application file for complete search history.

(56) References Cited

U.S. PATENT DOCUMENTS 9,276,742 B1 * 3/2016 Krishnan .............. H04L 9/3263
2012/0163590 A1   6/2012 Lieber et al.
(Continued)

FOREIGN PATENT DOCUMENTS

WO   WO2002/029577   4/2002
WO   WO-0229577 A2 * 4/2002   ......... G06F 21/6227

OTHER PUBLICATIONS

European Patent Office, "Communication Pursuant to Article 94(3) EPC," mailed in connection with European Patent Application No. 16779228.2, dated Mar. 11, 2021, 7 pages.
(Continued)

*Primary Examiner* — Hee K Song
(74) *Attorney, Agent, or Firm* — Hanley, Flight & Zimmerman, LLC (57) ABSTRACT

Technologies for secure certificate management include a computing device that receives a keystore command related to an encryption key, converts the keystore command into an encrypted database command, unlocks an encrypted database stored by the computing device with an obfuscated passphrase, and executes the encrypted database command.
(Continued)

The encrypted database includes a key table to store binary copies of encryption keys and a metadata table to store metadata related to the encryption keys. The computing device returns a response to the keystore command in response to executing the encrypted database command. The keystore command may be received and the response may be returned via a command-line interface or a machine-to-machine interface. The computing device may load multiple encoded passphrase segments from corresponding predetermined file system locations, decode the encoded passphrase segments, and compound the decoded passphrase segments to generate the passphrase. Other embodiments are described and claimed.

22 Claims, 3 Drawing Sheets

(52) U.S. Cl.
CPC ............... *G06F 2221/2107* (2013.01); *H04L 2209/046* (2013.01); *H04L 2209/16* (2013.01)

(56) References Cited

U.S. PATENT DOCUMENTS

| | | | |
|---|---|---|---|
| 2013/0067226 A1* | 3/2013 | Kunde | G06F 21/6227 713/168 |
| 2014/0112477 A1* | 4/2014 | Agarwal | H04L 9/0894 380/277 |
| 2014/0250511 A1 | 9/2014 | Kendall | |
| 2015/0180656 A1* | 6/2015 | Rich | G06F 21/602 713/168 |
| 2016/0094346 A1* | 3/2016 | Krishnan | H04L 9/0894 380/277 |
| 2020/0183953 A1* | 6/2020 | Bhan | G06F 16/285 |

OTHER PUBLICATIONS

PCT Search Report and Written Opinion prepared for PCT/US2016/052763, completed Apr. 12, 2017.

Fruhwirth, et al., "Secret Messages: Hard disk encryption with DM-Crypt, LUKS, and cryptsetup"; Dec. 2005; www.linux-magazine.com; Issue 61; pp. 65-71.

* cited by examiner

TECHNOLOGIES FOR USER-MODE PERSISTENCE OF CERTIFICATES AND KEYS IN RESOURCE-CONSTRAINED DEVICES

CROSS REFERENCE TO RELATED APPLICATIONS

The present application is a national stage entry under 35 USC § 371(b) of International Application No. PCT/US2016/052763, filed Sep. 21, 2016.

BACKGROUND

Typical computing devices may require userland applications and services to persist encryption keys and certificates as files on disk. The keys and certificates may be stored in plain text, and access to such files may be restricted through file permissions and/or access control lists. Certain computing devices may include dedicated hardware for secure key storage, such as a trusted platform module (TPM). However, many embedded systems or other small devices may not include such hardware.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
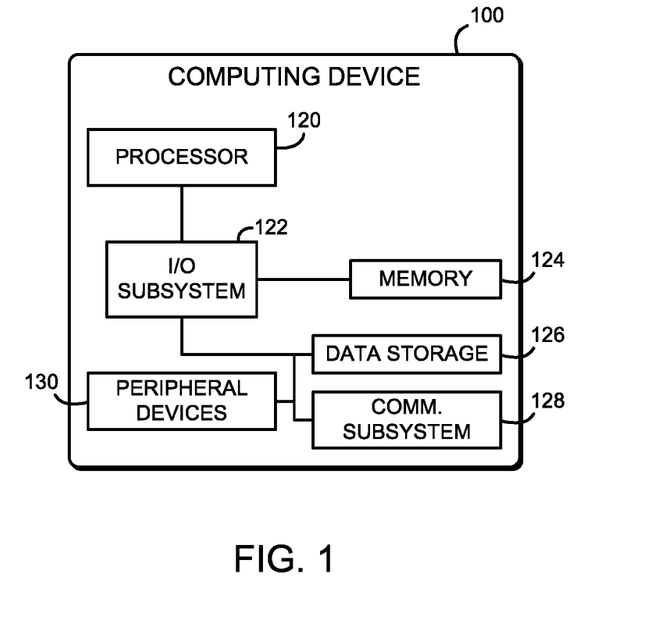
FIG. 1 is a simplified block diagram of at least one embodiment of a computing device for key and certificate persistence.

Referring now to FIG. 1, in an illustrative embodiment, a computing device 100 may be used for encryption key and certificate persistence. In use, as described further below, a computing device 100 may receive a keystore command, for example via a command-line interface or a machine-to-machine interface, convert the keystore command to a lower-level encrypted database command, and execute the command against a lower-level encrypted database. The computing device 100 protects the encrypted database with an obfuscated passphrase stored by the computing device 100. The computing device 100 may load multiple encoded segments of the passphrase from corresponding predetermined file system locations, decode the segments, and compound the segments together to recover the complete passphrase. Accordingly, the computing device 100 allows encryption keys and related certificates to be securely persisted in a central keystore stored locally by the computing device 100. The computing device 100 thus provides a lightweight key and certificate management solution that is appropriate for systems with limited computing resources and does not require dedicated trusted platform module (TPM) hardware or the development effort needed to integrate a TPM. Additionally, the obfuscated passphrase provides a lightweight technique to protect the encrypted database against unsophisticated attacks, without requiring hardware protection of the passphrase. Further, because various attributes of the passphrase obfuscation technique may vary between devices (e.g., the location of encoded segments, the algorithm used for compounding segments, etc.), determining the passphrase may require nontrivial effort, even for sophisticated attackers. Accordingly, the techniques of the computing device 100 may improve operational security for systems in which it is deployed.

The computing device 100 may be embodied as any type of computation or computer device capable of performing the functions described herein, including, without limitation, an embedded device, a sensor, an Internet-of-Things gateway, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes the processor 120, an input/output subsystem 122, a memory 124, a data storage device 126, and a communication subsystem 128. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers.

The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may establish a file system which may be used to store encrypted database files and obfuscated passphrase files, as described further below.

The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, one or more sensors and/or other input/output devices, interface devices, and/or peripheral devices.

Figure 2:
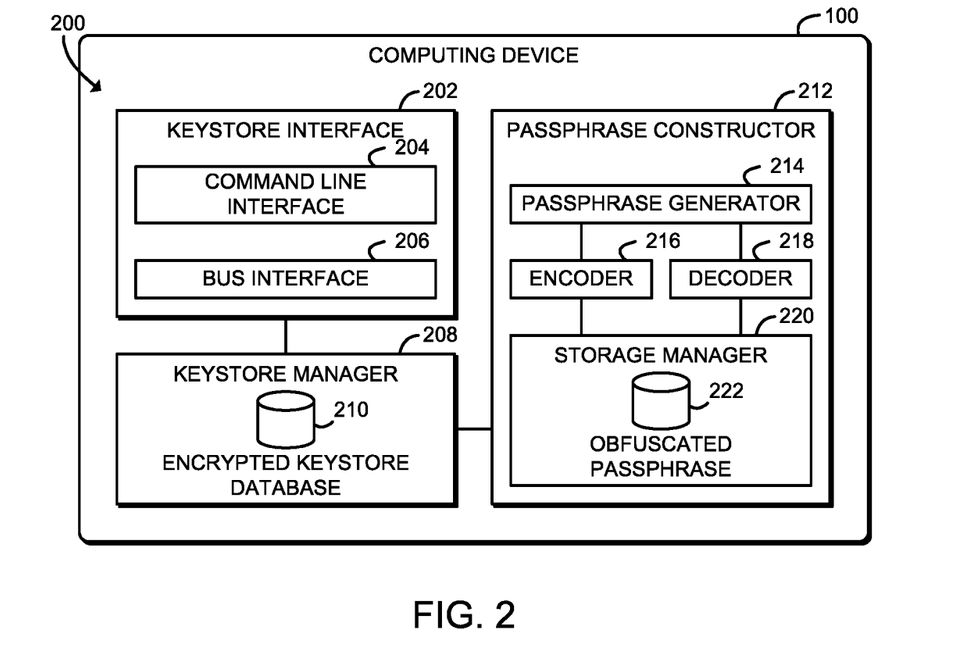
FIG. 2 is a simplified block diagram of an environment that may be established by the computing device of FIG. 1.

Referring now to FIG. 2, in an illustrative embodiment, the computing device 100 establishes an environment 200 during operation. The illustrative environment 200 includes a keystore interface 202, a keystore manager 208, and a passphrase constructor 212. The various components of the environment 200 may be embodied as hardware, firmware, software, or a combination thereof. As such, in some embodiments, one or more of the components of the environment 200 may be embodied as circuitry or collection of electrical devices (e.g., keystore interface circuitry 202, keystore manager circuitry 208, and/or passphrase constructor circuitry 212). It should be appreciated that, in such embodiments, one or more of the keystore interface circuitry 202, the keystore manager circuitry 208, and/or the passphrase constructor circuitry 212 may form a portion of one or more of the processor 120, the I/O subsystem 122, and/or other components of the computing device 100. Additionally, in some embodiments, one or more of the illustrative components may form a portion of another component and/or one or more of the illustrative components may be independent of one another.

The keystore interface 202 is configured to receive keystore commands related to an encryption key and/or a related certificate. Each keystore command may be embodied as, for example, a command to insert the encryption key, select the encryption key based on metadata related to the encryption key, or delete the encryption key. The keystore interface 202 is further configured to return a response to the keystore command in response executing an encrypted database command, as described further below. The command may be received and the response may be returned via a command-line interface or a machine-to-machine message interface. In some embodiments, those functions may be performed by one or more sub-components, such as a command line interface 204 or a bus interface 206.

The keystore manager 208 is configured to convert the keystore commands into corresponding encrypted database commands. An encrypted database command may be embodied as any command to be executed against an encrypted keystore database 210. The encrypted keystore database 210 may be embodied as any encrypted, locally stored database of the computing device 100, such as a SQLite database or other low-overhead local database. The encrypted keystore database 210 includes a key table to store binary copies of encryption keys and/or certificates, as well as a metadata table to store metadata related to the encryption keys.

The keystore manager 208 is further configured to unlock the encrypted keystore database 210 with an obfuscated passphrase 222 stored by the computing device 100 and to execute encrypted database commands against the encrypted keystore database 210. The encrypted database commands may include, for example, commands to insert an encryption key in the key table and to insert metadata related to the encryption key in the metadata table, commands to join the key table and the metadata table and to select the encryption key based on the metadata related to the encryption key, or commands to delete the encryption key from the key table and to delete metadata related to the encryption key from the metadata table. The keystore manager 208 may be further configured to create the encrypted keystore database 210 in response to a keystore command to create a keystore. The newly created encrypted keystore database 210 may be locked by a random passphrase corresponding to the obfuscated passphrase 222.

The passphrase constructor 212 is configured to load multiple encoded passphrase segments from corresponding predetermined file system locations of the computing device 100. The passphrase constructor 212 is further configured to decode the plurality of encoded passphrase segments and to compound the decoded passphrase segments to generate a complete passphrase. As described above, the passphrase may be used to unlock the encrypted keystore database 210. The passphrase constructor 212 may be further configured to overwrite local variables to obscure predetermined file system location data in response to loading the encoded passphrase segments. In some embodiments, the passphrase constructor 212 may be configured to generate a random passphrase in response to receiving a keystore command to create a keystore and to obfuscate the random passphrase to generate the obfuscated passphrase 222 that is stored by the computing device 100. The random passphrase may include multiple passphrase segments, including random numbers, values unique to the computing device 100, and/or user input values. The passphrase constructor 212 may be configured to obfuscate the random passphrase by encoding each passphrase segment to generate multiple encoded passphrase segments, storing each encoded passphrase segment at a corresponding predetermined file system location of the computing device 100, and obfuscating predetermined file system location data that can be used to access the encoded segments. For example, the predetermined file system location data to be obfuscated may include strings of a binary application that contain path and/or file name data of the encoded segments. In some embodiments, those functions may be performed by one or more sub-components, such as a passphrase generator 214, an encoder 216, a decoder 218, and/or a storage manager 220.

Figure 3:
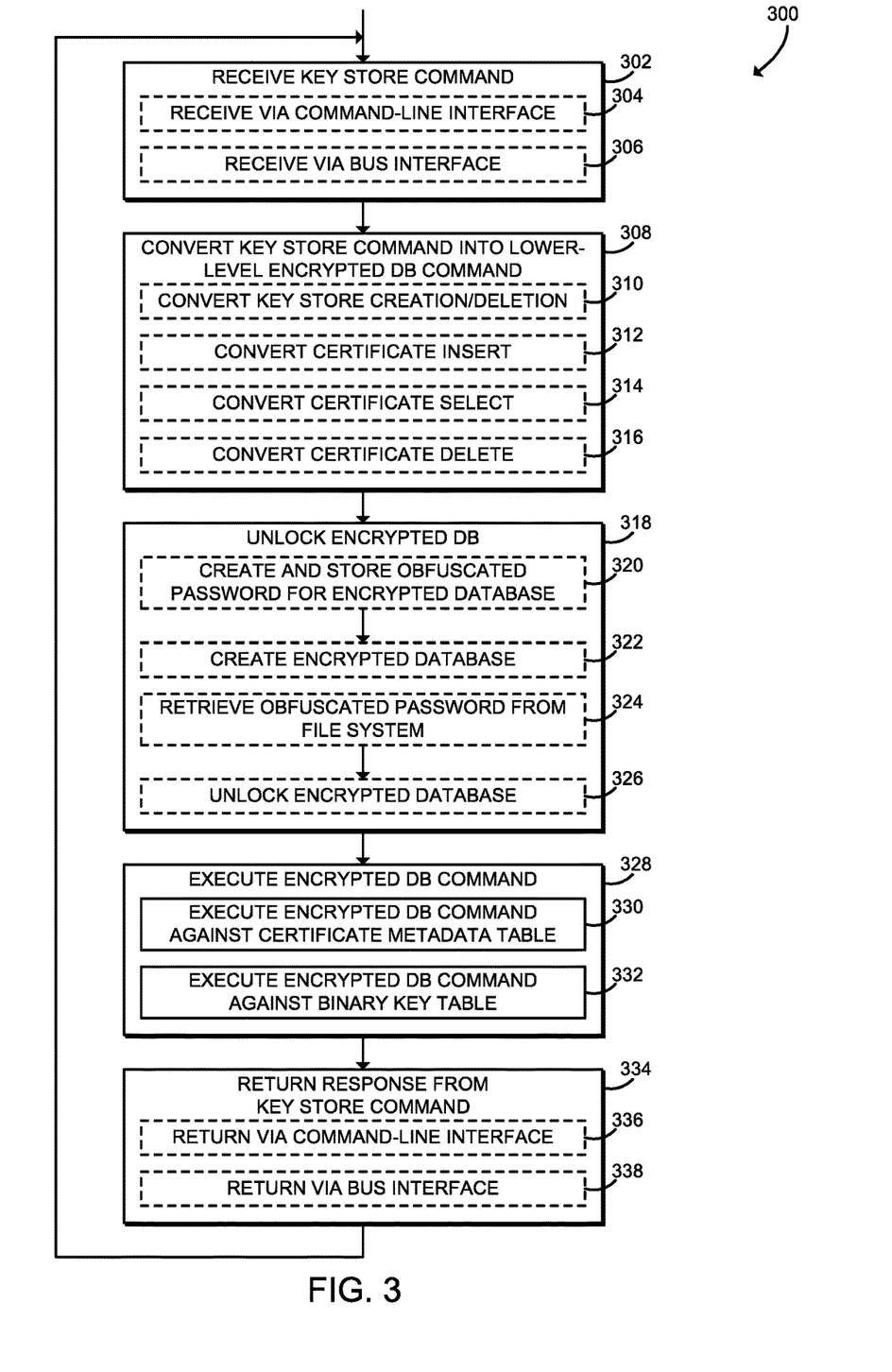
FIG. 3 is a simplified flow diagram of at least one embodiment of a method for key and certificate management that may be executed by the computing device of FIGS. 1-2.

Referring now to FIG. 3, in use, the computing device 100 may execute a method 300 for key and certificate management. It should be appreciated that, in some embodiments, the operations of the method 300 may be performed by one or more modules of the environment 200 of the computing device 100 as shown in FIG. 2. The method 300 begins in block 302, in which the computing device 100 receives a keystore command. The keystore command may include any command related to a keystore and/or an encryption key or related certificate. For example, the keystore command may include a command to create or delete a keystore or a command to insert, select, or delete a certificate from the keystore. In some embodiments, in block 304 the computing device 100 may receive the keystore command via a command-line interface. The command-line interface may serve as a local interface to the keystore for users and local processes of the computing device 100. In some embodiments, in block 306 the computing device 100 may receive the keystore command via a bus interface. The bus interface may be embodied as any information bus, machine-to-machine protocol, interprocess communication channel, message protocol, or other communication protocol that supports programmatic messaging. For example, the bus interface may be embodied as an MQTT interface. Thus, the bus interface may enable secure communication with trusted remote messaging entities and/or local processes executed by the computing device 100.

In block 308, the computing device 100 converts the keystore command into a lower-level command understood by the encrypted keystore database 210. In some embodiments, in block 310 the computing device 100 may convert a keystore command to create or delete the keystore into a command to create or delete the encrypted keystore database 210 or its included data tables. In some embodiments, in block 312 the computing device 100 may convert a keystore insert certificate command into a command to insert the encryption key or certificate and related metadata into the encrypted keystore database 210. In some embodiments, in block 314 the computing device 100 may convert a keystore select certificate command into a command to select the encryption key or certificate from the encrypted keystore database 210. For example, the lower-level command may select the certificate based on the related metadata. In some embodiments, in block 316 the computing device 100 may convert a keystore delete certificate command into a command to delete the encryption key or certificate and related metadata from the encrypted keystore database 210.

In block 318, the computing device 100 may unlock the encrypted keystore database 210. The computing device 100 may use any technique to decrypt, authenticate, or otherwise gain access to data of the encrypted keystore database 210. In some embodiments, as described further below, the computing device 100 may also create the encrypted keystore database 210 if needed (for example, in response to a keystore creation command). Additionally, although illustrated as being unlocked during execution of the method 300, it should be understood that in some embodiments the encrypted keystore database 210 may be unlocked at other times, such as when launching an application process of the computing device 100.

In some embodiments, in block 320 the computing device 100 may create and store an obfuscated passphrase 222 for the encrypted keystore database 210. Encoded segments of the obfuscated passphrase 222 may be stored in one or more files in the data storage device 126. One embodiment of a method for creating the obfuscated passphrase 222 is described below in connection with FIG. 4. After creating and storing the obfuscated passphrase 222, in block 322 the computing device 100 creates the encrypted keystore database 210. The obfuscated passphrase 222 is used to lock or otherwise secure the encrypted keystore database 210.

In some embodiments, in block 324 the computing device 100 may retrieve an obfuscated passphrase 222 from the file system of the computing device 100. For example, encoded segments of the obfuscated passphrase 222 may be retrieved from one or more files stored in the data storage device 126. One embodiment of a method for retrieving the obfuscated passphrase 222 is described below in connection with FIG. 5. After retrieving the obfuscated passphrase 222, in block 326 the computing device 100 unlocks the encrypted keystore database 210 using the passphrase.

In block 328 the computing device 100 executes the lower-level encrypted database command against the encrypted keystore database 210. In block 330, the computing device 100 executes an encrypted database command against a certificate metadata table of the encrypted keystore database 210. For example, the computing device 100 may insert, select, and/or delete metadata related to a certificate in the certificate metadata table. In block 332, the computing device 100 executes an encrypted database command against a binary key table of the encrypted keystore database 210. For example, the computing device 100 may insert, select, and/or delete the binary data of the encryption key or related certificate in the binary key table. Additionally or alternatively, although illustrated as executing commands against the certificate metadata table and the binary certificate table, it should be understood that in some embodiments the computing device 100 may execute a single command, for example using a table join.

In block 334, the computing device 100 returns a response to the keystore command. The computing device 100 may translate, interpret, or otherwise convert response data from the low-level database command into a response for the keystore command. In some embodiments, in block 336, the computing device 100 may return the response via the command-line interface. In some embodiments, in block 338, the computing device 100 may return the response via the bus interface. After returning the response, the method 300 loops back to block 302, in which the computing device 100 may process additional keystore commands.

Figure 4:
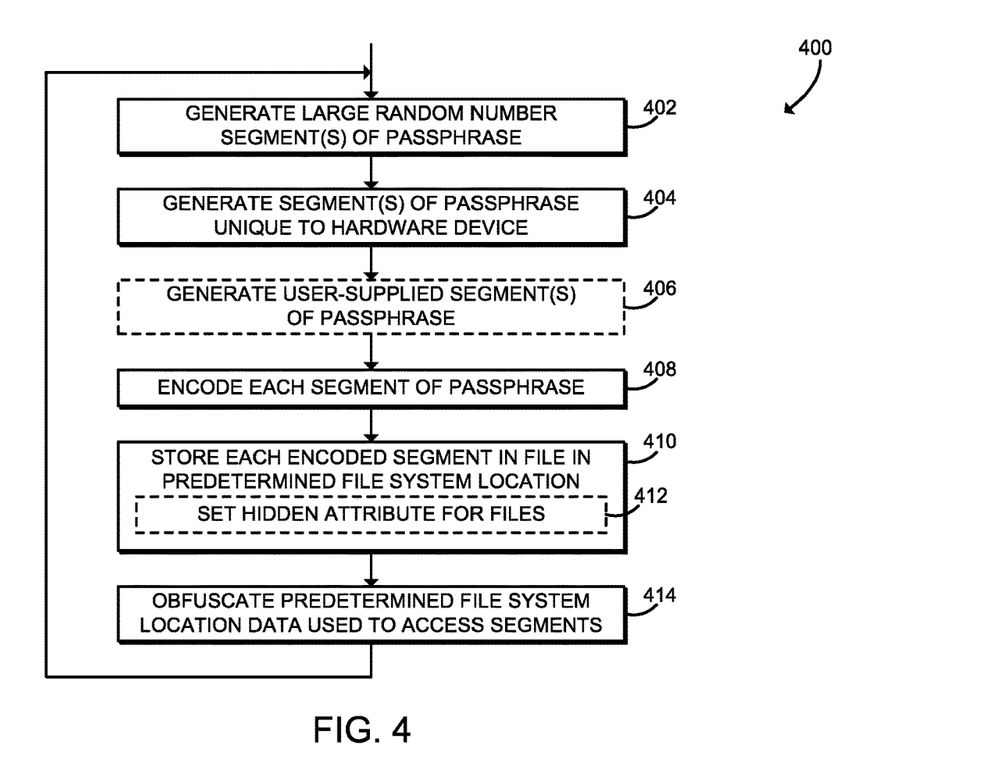
FIG. 4 is a simplified flow diagram of at least one embodiment of a method for obfuscated passphrase generation that may be executed by the computing device of FIGS. 1-2.

Referring now to FIG. 4, in use, the computing device 100 may execute a method 400 for obfuscated passphrase generation. It should be appreciated that, in some embodiments, the operations of the method 400 may be performed by one or more modules of the environment 200 of the computing device 100 as shown in FIG. 2. The method 400 begins in block 402, in which the computing device 100 generates one or more large random number segments of the passphrase. The computing device 100 may use any random number generator, pseudorandom number generator, or other entropy source to generate the random number segments. In block 404, the computing device 100 generates one or more segments of the passphrase that are unique to the hardware of the computing device 100. The segments may be embodied as, for example, a serial number, hardware address, or other hardwired identification number of the computing device 100. In some embodiments, the segments unique to the computing device 100 may be previously provisioned to the data storage device 126 or other nonvolatile storage of the computing device 100. In some embodiments, in block 406 the computing device 100 may generate one or more user-supplied segments of the passphrase. For example, the computing device 100 may receive a password or other user input from a user of the computing device 100.

In block 408, the computing device 100 encodes each segment of the passphrase. The segments may be encoded using any reversible process that transforms plain text or other usable data of the passphrase into binary data that is unreadable as plain text. Thus, an unsophisticated attacker, for example using a text editor or a hex editor, may not be capable of extracting the segments of the passphrase from the encoded segments.

In block 410, the computing device 100 stores each encoded segment in a separate file at a predetermined file system location. Each predetermined file system location may be embodied as any arbitrary path and file name that does not interfere with the operation of the computing device 100. In some embodiments, the predetermined file system locations may be selected to be obscure or non-obvious to an unsophisticated attacker. For example, each encoded passphrase segment may be given a filename and/or a file extension that is similar to other files in the same directory. In some embodiments, in block 412, the computing device 100 may set a hidden attribute for the files and/or directories that include the encoded passphrase segments. Setting the hidden attribute, while not making the files completely inaccessible, may also deter an unsophisticated attacker.

In block 414, the computing device 100 obfuscates predetermined file system location data that may be used to access the encoded passphrase segments. For example, the computing device 100 may obfuscate strings including path and filename data included in any binary applications that access the encoded passphrase segments. Again, obfuscating such predetermined file system location data may deter unsophisticated attackers, for example by preventing the predetermined file system location data from being read from an application binary by using a hex editor or by decompiling the binary. After storing the obfuscated passphrase, the method 400 loops back to block 402, in which the computing device 100 may generate additional obfuscated passphrases.

Figure 5:
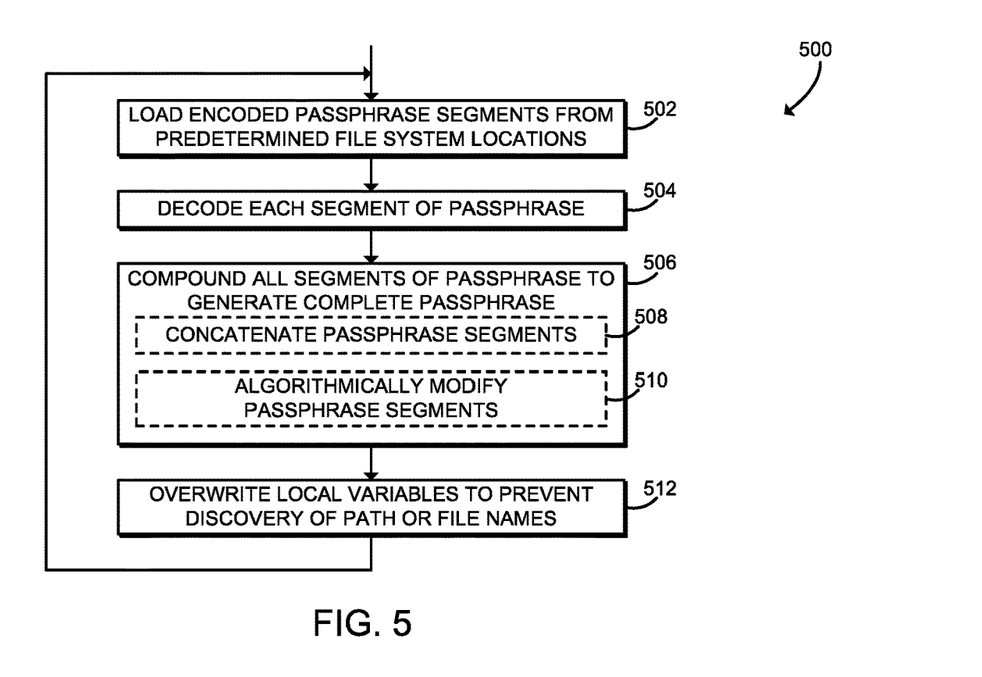
FIG. 5 is a simplified flow diagram of at least one embodiment of a method for obfuscated passphrase retrieval that may be executed by the computing device of FIGS. 1-2.

Referring now to FIG. 5, in use, the computing device 100 may execute a method 500 for obfuscated passphrase retrieval. It should be appreciated that, in some embodiments, the operations of the method 500 may be performed by one or more modules of the environment 200 of the computing device 100 as shown in FIG. 2. The method 500 begins in block 502, in which the computing device 100 loads multiple encoded segments of the passphrase from corresponding predetermined file system locations. As described above in connection with block 410 of FIG. 4, each predetermined file system location may be embodied as any arbitrary path and file name that does not interfere with the operation of the computing device 100. The computing device 100 may be preconfigured with file system location data that may be used to load the encoded passphrase segments, for example by including the path and file names in an application binary. As described above in connection with block 414 of FIG. 4, the file system location data may be obfuscated to prevent disclosure to unsophisticated attackers.

In block 504, the computing device 100 decodes each encoded segment of the passphrase to recover the plain text or other usable form of the passphrase segments. As described above in connection with block 408 of FIG. 4, each passphrase segment may be encoded using any reversible process that transforms plain text or other usable data of the passphrase into binary data that is unreadable as plain text.

In block 506, the computing device 100 compounds all segments of the passphrase to generate the complete passphrase. The computing device 100 may compound the segments using any algorithm, function, or other process that predictably combines data from all of the segments into a complete passphrase. After generating the passphrase, the computing device 100 may use the passphrase to access one or more secured resources, such as the encrypted keystore database 210, as described above in connection with block 318 of FIG. 3. In some embodiments, in block 508 the computing device 100 may concatenate textual representations of the passphrase segments to generate the complete passphrase. In some embodiments, in block 510, the computing device 100 may algorithmically modify some or all of the passphrase segments as they are compounded. The computing device 100 may perform any predetermined algorithm to modify the passphrase segments.

After generating the complete passphrase, in block 512 the computing device 100 may overwrite any local variables used when loading the encoded passphrase segments, to prevent traces of the path or file names of the encoded segments from being left in discoverable memory locations. The computing device 100 may overwrite the variables with random data or any other data that obscures the path or file name data. After overwriting the local variables, the method

500 loops back to block 502, in which the computing device 100 may load additional obfuscated passphrases.

It should be appreciated that, in some embodiments, the methods 300, 400, and/or 500 may be embodied as various instructions stored on a computer-readable media, which may be executed by the processor 120, the I/O subsystem 122, and/or other components of the computing device 100 to cause the computing device 100 to perform the respective method 300, 400, and/or 500. The computer-readable media may be embodied as any type of media capable of being read by the computing device 100 including, but not limited to, the memory 124, the data storage device 126, firmware devices, and/or other media.

EXAMPLES

Illustrative examples of the technologies disclosed herein are provided below. An embodiment of the technologies may include any one or more, and any combination of, the examples described below.

Example 1 includes a computing device for secure certificate management, the computing device comprising: a keystore interface to receive a keystore command related to an encryption key; and a keystore manager to (i) convert the keystore command into an encrypted database command, (ii) unlock an encrypted database stored by the computing device with an obfuscated passphrase stored by the computing device, wherein the encrypted database includes a key table to store binary copies of encryption keys and a metadata table to store metadata related to the encryption keys, and (iii) execute the encrypted database command against the encrypted database; wherein the keystore interface is further to return a response to the keystore command in response to execution of the encrypted database command.

Example 2 includes the subject matter of Example 1, and wherein: to receive the keystore command comprises to receive the keystore command via a command-line interface; and to return the response comprises to return the response via the command-line interface.

Example 3 includes the subject matter of any of Examples 1 and 2, and wherein: to receive the keystore command comprises to receive the keystore command via a machine-to-machine message interface; and to return the response comprises to return the response via the machine-to-machine message interface.

Example 4 includes the subject matter of any of Examples 1-3, and wherein: the keystore command comprises a command to insert the encryption key; and to execute the encrypted database command comprises to (i) insert the encryption key in the key table of the encrypted database and (ii) insert metadata related to the encryption key in the metadata table of the encrypted database.

Example 5 includes the subject matter of any of Examples 1-4, and wherein: the keystore command comprises a command to select the encryption key based on metadata related to the encryption key; and to execute the encrypted database command comprises to (i) join the key table and the metadata table of the encrypted database and (ii) select the encryption key based on the metadata related to the encryption key.

Example 6 includes the subject matter of any of Examples 1-5, and wherein: the keystore command comprises a command to delete the encryption key; and to execute the encrypted database command comprises to (i) delete the encryption key from the key table of the encrypted database and (ii) delete metadata related to the encryption key from the metadata table of the encrypted database.

Example 7 includes the subject matter of any of Examples 1-6, and further comprising a passphrase constructor to: load each encoded passphrase segment of a plurality of encoded passphrase segments from a corresponding predetermined file system location of the computing device; decode the plurality of encoded passphrase segments to generate a plurality of passphrase segments; and compound the plurality of passphrase segments to generate the passphrase; wherein to unlock the encrypted database comprises to unlock the encrypted database with the passphrase.

Example 8 includes the subject matter of any of Examples 1-7, and wherein to compound the plurality of passphrase segments comprises to concatenate the plurality of passphrase segments.

Example 9 includes the subject matter of any of Examples 1-8, and wherein to compound the plurality of passphrase segments comprises to algorithmically modify each of the plurality of passphrase segments.

Example 10 includes the subject matter of any of Examples 1-9, and wherein the passphrase constructor is further to overwrite a local variable to obscure predetermined file system location data in response to loading of each encoded passphrase segment of the plurality of encoded passphrase segments.

Example 11 includes the subject matter of any of Examples 1-10, and wherein: the keystore interface is further to receive a second keystore command to create a keystore; the computing device further comprises a passphrase constructor to (i) generate a random passphrase in response to receipt of the second keystore command, wherein the random passphrase comprises a plurality of segments, and (ii) obfuscate the random passphrase to generate the obfuscated passphrase stored by the computing device; the keystore manager is further to create the encrypted database, wherein the encrypted database is locked by the random passphrase; and to receive the keystore command comprises to receive the keystore command in response to creation of the encrypted database.

Example 12 includes the subject matter of any of Examples 1-11, and wherein to generate the random passphrase comprises to generate a first segment of the random passphrase and a second segment of the random passphrase, wherein the first segment comprises a random number and the second segment comprises a value unique to the computing device; and compound the plurality of segments to generate the random passphrase, wherein the plurality of segments includes the first segment and the second segment.

Example 13 includes the subject matter of any of Examples 1-12, and wherein to generate the random passphrase further comprises to generate a third segment of the random passphrase based on a user input value, wherein the plurality of segments further comprises the third segment.

Example 14 includes the subject matter of any of Examples 1-13, and wherein to obfuscate the random passphrase comprises to: encode each segment of the plurality of segments of the random passphrase to generate a plurality of encoded segments; store each encoded segment of the plurality of encoded segments at a corresponding predetermined file system location of the computing device; and obfuscate predetermined file system location data to be used to access the plurality of encoded segments.

Example 15 includes the subject matter of any of Examples 1-14, and wherein to store each encoded segment of the plurality of encoded segments at the corresponding predetermined file system location comprises to set a hidden attribute associated with each of the corresponding predetermined file system locations.

Example 16 includes a computing device for obfuscated password management, the computing device comprising: a passphrase generator to generate a random passphrase, wherein the random passphrase comprises a plurality of segments; an encoder to encode each segment of the plurality of segments of the random passphrase to generate a plurality of encoded segments; and a storage manager to (i) store each encoded segment of the plurality of encoded segments at a corresponding predetermined file system location of the computing device, and (ii) obfuscate predetermined file system location data to be used to access the plurality of encoded segments.

Example 17 includes the subject matter of Example 16, and wherein to store each encoded segment of the plurality of encoded segments at the corresponding predetermined file system location comprises to set a hidden attribute associated with each of the corresponding predetermined file system locations.

Example 18 includes the subject matter of any of Examples 16 and 17, and wherein to generate the random passphrase comprises to generate a first segment of the random passphrase and a second segment of the random passphrase, wherein the first segment comprises a random number and the second segment comprises a value unique to the computing device; and compound the plurality of segments to generate the random passphrase, wherein the plurality of segments includes the first segment and the second segment.

Example 19 includes the subject matter of any of Examples 16-18, and wherein to generate the random passphrase further comprises to generate a third segment of the random passphrase based on a user input value, wherein the plurality of segments further comprises the third segment.

Example 20 includes the subject matter of any of Examples 16-19, and wherein to compound the plurality of segments comprises to concatenate the plurality of segments.

Example 21 includes the subject matter of any of Examples 16-20, and wherein to compound the plurality of segments comprises to algorithmically modify each of the plurality of segments.

Example 22 includes the subject matter of any of Examples 16-21, and wherein: the storage manager is further to load each encoded segment of the plurality of encoded segments from the corresponding predetermined file system location using the predetermined file system location data in response to obfuscation of the predetermined file system location data; the computing device further comprises a decoder to decode the plurality of encoded segments to generate a plurality of segments in response to loading the plurality of encoded segments; and the passphrase generator is further to compound the plurality of segments to generate the random passphrase in response to decoding of the plurality of encoded segments.

Example 23 includes the subject matter of any of Examples 16-22, and wherein the storage manager is further to overwrite a local variable to obscure the predetermined file system location data in response to loading of each encoded passphrase segment of the plurality of encoded passphrase segments.

Example 24 includes a method for secure certificate management, the method comprising: receiving, by a computing device, a keystore command related to an encryption key; converting, by the computing device, the keystore command into an encrypted database command; unlocking, by the computing device, an encrypted database stored by the computing device using an obfuscated passphrase stored by the computing device, wherein the encrypted database includes a key table to store binary copies of encryption keys and a metadata table to store metadata related to the encryption keys; executing, by the computing device, the encrypted database command against the encrypted database; and returning, by the computing device, a response to the keystore command in response to executing the encrypted database command.

Example 25 includes the subject matter of Example 24, and wherein: receiving the keystore command comprises receiving the keystore command via a command-line interface; and returning the response comprises returning the response via the command-line interface.

Example 26 includes the subject matter of any of Examples 24 and 25, and wherein: receiving the keystore command comprises receiving the keystore command via a machine-to-machine message interface; and returning the response comprises returning the response via the machine-to-machine message interface.

Example 27 includes the subject matter of any of Examples 24-26, and wherein: receiving the keystore command comprises receiving a command to insert the encryption key; and executing the encrypted database command comprises (i) inserting the encryption key in the key table of the encrypted database and (ii) inserting metadata related to the encryption key in the metadata table of the encrypted database.

Example 28 includes the subject matter of any of Examples 24-27, and wherein: receiving the keystore command comprises receiving a command to select the encryption key based on metadata related to the encryption key; and executing the encrypted database command comprises (i) joining the key table and the metadata table of the encrypted database and (ii) selecting the encryption key based on the metadata related to the encryption key.

Example 29 includes the subject matter of any of Examples 24-28, and wherein: receiving the keystore command comprises receiving a command to delete the encryption key; and executing the encrypted database command comprises (i) deleting the encryption key from the key table of the encrypted database and (ii) deleting metadata related to the encryption key from the metadata table of the encrypted database.

Example 30 includes the subject matter of any of Examples 24-29, and wherein unlocking the encrypted database stored by the computing device using the obfuscated passphrase comprises: loading each encoded passphrase segment of a plurality of encoded passphrase segments from a corresponding predetermined file system location of the computing device; decoding the plurality of encoded passphrase segments to generate a plurality of passphrase segments; compounding the plurality of passphrase segments to generate the passphrase; and unlocking the encrypted database using the passphrase.

Example 31 includes the subject matter of any of Examples 24-30, and wherein compounding the plurality of passphrase segments comprises concatenating the plurality of passphrase segments.

Example 32 includes the subject matter of any of Examples 24-31, and wherein compounding the plurality of passphrase segments comprises algorithmically modifying each of the plurality of passphrase segments.

Example 33 includes the subject matter of any of Examples 24-32, and wherein unlocking the encrypted database further comprises overwriting a local variable to obscure predetermined file system location data in response to loading each encoded passphrase segment of the plurality of encoded passphrase segments.

Example 34 includes the subject matter of any of Examples 24-33, and further comprising: receiving, by the computing device, a second keystore command to create a keystore; generating, by the computing device, a random passphrase, wherein the random passphrase comprises a plurality of segments; obfuscating, by the computing device, the random passphrase to generate the obfuscated passphrase stored by the computing device; and creating, by the computing device, the encrypted database, wherein the encrypted database is locked by the random passphrase; wherein receiving the keystore command comprises receiving the keystore command in response to creating the encrypted database.

Example 35 includes the subject matter of any of Examples 24-34, and wherein generating the random passphrase comprises generating a first segment of the random passphrase and a second segment of the random passphrase, wherein the first segment comprises a random number and the second segment comprises a value unique to the computing device; and compounding the plurality of segments to generate the random passphrase, wherein the plurality of segments includes the first segment and the second segment.

Example 36 includes the subject matter of any of Examples 24-35, and wherein generating the random passphrase further comprises generating a third segment of the random passphrase based on a user input value, wherein the plurality of segments further comprises the third segment.

Example 37 includes the subject matter of any of Examples 24-36, and wherein obfuscating the random passphrase comprises: encoding each segment of the plurality of segments of the random passphrase to generate a plurality of encoded segments; storing each encoded segment of the plurality of encoded segments at a corresponding predetermined file system location of the computing device; and obfuscating predetermined file system location data to be used to access the plurality of encoded segments.

Example 38 includes the subject matter of any of Examples 24-37, and wherein storing each encoded segment of the plurality of encoded segments at the corresponding predetermined file system location comprises setting a hidden attribute associated with each of the corresponding predetermined file system locations.

Example 39 includes a method for obfuscated password management, the method comprising: generating, by a computing device, a random passphrase, wherein the random passphrase comprises a plurality of segments; encoding, by the computing device, each segment of the plurality of segments of the random passphrase to generate a plurality of encoded segments; storing, by the computing device, each encoded segment of the plurality of encoded segments at a corresponding predetermined file system location of the computing device; and obfuscating, by the computing device, predetermined file system location data to be used to access the plurality of encoded segments.

Example 40 includes the subject matter of Example 39, and wherein storing each encoded segment of the plurality of encoded segments at the corresponding predetermined file system location comprises setting a hidden attribute associated with each of the corresponding predetermined file system locations.

Example 41 includes the subject matter of any of Examples 39 and 40, and wherein generating the random passphrase comprises generating a first segment of the random passphrase and a second segment of the random passphrase, wherein the first segment comprises a random number and the second segment comprises a value unique to the computing device; and compounding the plurality of segments to generate the random passphrase, wherein the plurality of segments includes the first segment and the second segment.

Example 42 includes the subject matter of any of Examples 39-41, and wherein generating the random passphrase further comprises generating a third segment of the random passphrase based on a user input value, wherein the plurality of segments further comprises the third segment.

Example 43 includes the subject matter of any of Examples 39-42, and wherein compounding the plurality of segments comprises concatenating the plurality of segments.

Example 44 includes the subject matter of any of Examples 39-43, and wherein compounding the plurality of segments comprises algorithmically modifying each of the plurality of segments.

Example 45 includes the subject matter of any of Examples 39-44, and further comprising: loading, by the computing device, each encoded segment of the plurality of encoded segments from the corresponding predetermined file system location using the predetermined file system location data in response to obfuscating the predetermined file system location data; decoding, by the computing device, the plurality of encoded segments to generate a plurality of segments in response to loading the plurality of encoded segments; and compounding, by the computing device, the plurality of segments to generate the random passphrase in response to decoding the plurality of encoded segments.

Example 46 includes the subject matter of any of Examples 39-45, and further comprising overwriting, by the computing device, a local variable to obscure the predetermined file system location data in response to loading each encoded passphrase segment of the plurality of encoded passphrase segments.

Example 47 includes a computing device comprising: a processor; and a memory having stored therein a plurality of instructions that when executed by the processor cause the computing device to perform the method of any of Examples 24-46.

Example 48 includes one or more machine readable storage media comprising a plurality of instructions stored thereon that in response to being executed result in a computing device performing the method of any of Examples 24-46.

Example 49 includes a computing device comprising means for performing the method of any of Examples 24-46.

Example 50 includes a computing device for secure certificate management, the computing device comprising: means for receiving a keystore command related to an encryption key; means for converting the keystore command into an encrypted database command; means for unlocking an encrypted database stored by the computing device using an obfuscated passphrase stored by the computing device, wherein the encrypted database includes a key table to store binary copies of encryption keys and a metadata table to store metadata related to the encryption keys; means for executing the encrypted database command against the encrypted database; and means for returning a response to the keystore command in response to executing the encrypted database command.

Example 51 includes the subject matter of Example 50, and wherein: the means for receiving the keystore command comprises means for receiving the keystore command via a command-line interface; and the means for returning the response comprises means for returning the response via the command-line interface.

Example 52 includes the subject matter of any of Examples 50 and 51, and wherein: the means for receiving the keystore command comprises means for receiving the keystore command via a machine-to-machine message interface; and the means for returning the response comprises means for returning the response via the machine-to-machine message interface.

Example 53 includes the subject matter of any of Examples 50-52, and wherein: the means for receiving the keystore command comprises means for receiving a command to insert the encryption key; and the means for executing the encrypted database command comprises (i) means for inserting the encryption key in the key table of the encrypted database and (ii) means for inserting metadata related to the encryption key in the metadata table of the encrypted database.

Example 54 includes the subject matter of any of Examples 50-53, and wherein: the means for receiving the keystore command comprises means for receiving a command to select the encryption key based on metadata related to the encryption key; and the means for executing the encrypted database command comprises (i) means for joining the key table and the metadata table of the encrypted database and (ii) means for selecting the encryption key based on the metadata related to the encryption key.

Example 55 includes the subject matter of any of Examples 50-54, and wherein: the means for receiving the keystore command comprises means for receiving a command to delete the encryption key; and the means for executing the encrypted database command comprises (i) means for deleting the encryption key from the key table of the encrypted database and (ii) means for deleting metadata related to the encryption key from the metadata table of the encrypted database.

Example 56 includes the subject matter of any of Examples 50-55, and wherein the means for unlocking the encrypted database stored by the computing device using the obfuscated passphrase comprises: means for loading each encoded passphrase segment of a plurality of encoded passphrase segments from a corresponding predetermined file system location of the computing device; means for decoding the plurality of encoded passphrase segments to generate a plurality of passphrase segments; means for compounding the plurality of passphrase segments to generate the passphrase; and means for unlocking the encrypted database using the passphrase.

Example 57 includes the subject matter of any of Examples 50-56, and wherein the means for compounding the plurality of passphrase segments comprises means for concatenating the plurality of passphrase segments.

Example 58 includes the subject matter of any of Examples 50-57, and wherein the means for compounding the plurality of passphrase segments comprises means for algorithmically modifying each of the plurality of passphrase segments.

Example 59 includes the subject matter of any of Examples 50-58, and wherein the means for unlocking the encrypted database further comprises means for overwriting a local variable to obscure predetermined file system location data in response to loading each encoded passphrase segment of the plurality of encoded passphrase segments.

Example 60 includes the subject matter of any of Examples 50-59, and further comprising: means for receiving a second keystore command to create a keystore; means for generating a random passphrase, wherein the random passphrase comprises a plurality of segments; means for obfuscating the random passphrase to generate the obfuscated passphrase stored by the computing device; and means for creating the encrypted database, wherein the encrypted database is locked by the random passphrase; wherein the means for receiving the keystore command comprises means for receiving the keystore command in response to creating the encrypted database.

Example 61 includes the subject matter of any of Examples 50-60, and wherein the means for generating the random passphrase comprises: means for generating a first segment of the random passphrase and a second segment of the random passphrase, wherein the first segment comprises a random number and the second segment comprises a value unique to the computing device; and means for compounding the plurality of segments to generate the random passphrase, wherein the plurality of segments includes the first segment and the second segment.

Example 62 includes the subject matter of any of Examples 50-61, and wherein the means for generating the random passphrase further comprises means for generating a third segment of the random passphrase based on a user input value, wherein the plurality of segments further comprises the third segment.

Example 63 includes the subject matter of any of Examples 50-62, and wherein the means for obfuscating the random passphrase comprises: means for encoding each segment of the plurality of segments of the random passphrase to generate a plurality of encoded segments; means for storing each encoded segment of the plurality of encoded segments at a corresponding predetermined file system location of the computing device; and means for obfuscating predetermined file system location data to be used to access the plurality of encoded segments.

Example 64 includes the subject matter of any of Examples 50-63, and wherein the means for storing each encoded segment of the plurality of encoded segments at the corresponding predetermined file system location comprises means for setting a hidden attribute associated with each of the corresponding predetermined file system locations.

Example 65 includes a computing device for obfuscated password management, the computing device comprising: means for generating a random passphrase, wherein the random passphrase comprises a plurality of segments; means for encoding each segment of the plurality of segments of the random passphrase to generate a plurality of encoded segments; means for storing each encoded segment of the plurality of encoded segments at a corresponding predetermined file system location of the computing device; and means for obfuscating predetermined file system location data to be used to access the plurality of encoded segments.

Example 66 includes the subject matter of Example 65, and wherein the means for storing each encoded segment of the plurality of encoded segments at the corresponding predetermined file system location comprises means for setting a hidden attribute associated with each of the corresponding predetermined file system locations.

Example 67 includes the subject matter of any of Examples 65 and 66, and wherein the means for generating the random passphrase comprises: means for generating a first segment of the random passphrase and a second segment of the random passphrase, wherein the first segment comprises a random number and the second segment comprises a value unique to the computing device; and means for compounding the plurality of segments to generate the random passphrase, wherein the plurality of segments includes the first segment and the second segment.

Example 68 includes the subject matter of any of Examples 65-67, and wherein the means for generating the random passphrase further comprises means for generating a third segment of the random passphrase based on a user input value, wherein the plurality of segments further comprises the third segment.

Example 69 includes the subject matter of any of Examples 65-68, and wherein the means for compounding the plurality of segments comprises means for concatenating the plurality of segments.

Example 70 includes the subject matter of any of Examples 65-69, and wherein the means for compounding the plurality of segments comprises means for algorithmically modifying each of the plurality of segments.

Example 71 includes the subject matter of any of Examples 65-70, and further comprising: means for loading each encoded segment of the plurality of encoded segments from the corresponding predetermined file system location using the predetermined file system location data in response to obfuscating the predetermined file system location data; means for decoding the plurality of encoded segments to generate a plurality of segments in response to loading the plurality of encoded segments; and means for compounding the plurality of segments to generate the random passphrase in response to decoding the plurality of encoded segments.

Example 72 includes the subject matter of any of Examples 65-71, and further comprising means for overwriting a local variable to obscure the predetermined file system location data in response to loading each encoded passphrase segment of the plurality of encoded passphrase segments.

What is claimed is:

1. A computing device for secure certificate management, the computing device comprising:
   memory including computer readable instructions; and
   a processor to execute the instructions to at least:
      obtain a keystore command related to an encryption key;
      load respective encoded passphrase segments of a plurality of encoded passphrase segments from a predetermined file system location of the computing device;
      decode the plurality of encoded passphrase segments to generate a plurality of passphrase segments;
      compound the plurality of passphrase segments to generate an obfuscated passphrase;
      convert the keystore command into an encrypted database command;
      unlock an encrypted database stored by the computing device with the obfuscated passphrase stored by the computing device, wherein the encrypted database includes a key table to store binary copies of encryption keys and a metadata table to store metadata related to the encryption keys;
      execute the encrypted database command against the encrypted database; and
      return a response to the keystore command in response to execution of the encrypted database command.

2. The computing device of claim 1, wherein the processor is to:
   obtain the keystore command via a command-line interface; and
   return the response via the command-line interface.

3. The computing device of claim 1, wherein the processor is to:
   obtain the keystore command via a machine-to-machine message interface; and
   return the response via the machine-to-machine message interface.

4. The computing device of claim 1, wherein the keystore command includes a command to insert the encryption key, and wherein the processor is to execute the encrypted database command by (i) inserting the encryption key in the key table of the encrypted database and (ii) inserting metadata related to the encryption key in the metadata table of the encrypted database.

5. The computing device of claim 1, wherein the keystore command includes a command to select the encryption key based on metadata related to the encryption key, and wherein the processor is to execute the encrypted database command by (i) joining the key table and the metadata table of the encrypted database and (ii) selecting the encryption key based on the metadata related to the encryption key.

6. The computing device of claim 1, wherein the keystore command includes a command to delete the encryption key, and wherein the processor is to execute the encrypted database command by (i) deleting the encryption key from the key table of the encrypted database and (ii) deleting metadata related to the encryption key from the metadata table of the encrypted database.

7. A computing device for secure certificate management, the computing device comprising:
   memory including computer readable instructions; and
   a processor to execute the instructions to at least:
      obtain a keystore command related to an encryption key;
      load respective encoded passphrase segments of a plurality of encoded passphrase segments from a predetermined file system location of the computing device;
      overwrite a local variable to obscure predetermined file system location data in response to loading of the respective encoded passphrase segments of the plurality of encoded passphrase segments;
      decode the respective encoded passphrase segments to generate a plurality of passphrase segments;
      compound the plurality of passphrase segments to generate an obfuscated passphrase;
      convert the keystore command into an encrypted database command;
      unlock an encrypted database stored by the computing device with the obfuscated passphrase stored by the computing device, wherein the encrypted database includes a key table to store binary copies of encryption keys and a metadata table to store metadata related to the encryption keys;
      execute the encrypted database command against the encrypted database; and
      return a response to the keystore command in response to execution of the encrypted database command.

8. A computing device for secure certificate management, the computing device comprising:
memory including computer readable instructions; and
a processor to execute the instructions to at least:
obtain a first keystore command to create a keystore;
generate a random passphrase in response to receipt of the first keystore command, wherein the random passphrase includes a plurality of segments;
obfuscate the random passphrase to generate an obfuscated passphrase stored by the computing device;
in response to obtaining the first keystore command, create an encrypted database, wherein the encrypted database is locked by the random passphrase;
in response to creation of the encrypted database, obtain a second keystore command related to an encryption key;
in response to obtaining the second keystore command, (i) convert the second keystore command into an encrypted database command (ii) unlock the encrypted database stored by the computing device with the obfuscated passphrase stored by the computing device, wherein the encrypted database includes a key table to store binary copies of encryption keys and a metadata table to store metadata related to the encryption keys, and (iii) execute the encrypted database command against the encrypted database; and
return a response to the second keystore command in response to execution of the encrypted database command.

9. A computing device for secure certificate management, the computing device comprising:
memory including computer readable instructions; and
a processor to execute the instructions to at least:
obtain a first keystore command to create a keystore;
generate a random passphrase in response to receipt of the first keystore command, wherein the random passphrase includes a plurality of segments;
generate a first segment of the random passphrase and a second segment of the random passphrase, wherein the first segment includes a random number and the second segment includes a value unique to the computing device;
compound the plurality of segments to generate the random passphrase, wherein the plurality of segments includes the first segment and the second segment;
obfuscate the random passphrase to generate an obfuscated passphrase stored by the computing device;
in response to obtaining the first keystore command, create an encrypted database, wherein the encrypted database is locked by the random passphrase;
in response to creation of the encrypted database, obtain a second keystore command related to an encryption key;
in response to obtaining the second keystore command, (i) convert the second keystore command into an encrypted database command (ii) unlock the encrypted database stored by the computing device with the obfuscated passphrase stored by the computing device, wherein the encrypted database includes a key table to store binary copies of encryption keys and a metadata table to store metadata related to the encryption keys, and (iii) execute the encrypted database command against the encrypted database, wherein the processor is to obtain the second keystore command in response to creation of the encrypted database; and
return a response to the second keystore command in response to execution of the encrypted database command.

10. A computing device for secure certificate management, the computing device comprising:
memory including computer readable instructions; and
a processor to execute the instructions to at least:
obtain a first keystore command to create a keystore; and
generate a random passphrase in response to receipt of the first keystore command, wherein the random passphrase includes a plurality of segments, the processor to:
generate a first segment of the random passphrase and a second segment of the random passphrase, wherein the first segment includes a random number and the second segment includes a value unique to the computing device;
generate a third segment of the random passphrase based on a user input value; and
compound the plurality of segments to generate the random passphrase, wherein the plurality of segments includes the first segment, the second segment, and the third segment;
obfuscate the random passphrase to generate an obfuscated passphrase stored by the computing device;
in response to obtaining the first keystore command, create an encrypted database, wherein the encrypted database is locked by the random passphrase;
in response to creation of the encrypted database, obtain a second keystore command related to an encryption key;
in response to obtaining the second keystore command, (i) convert the second keystore command into an encrypted database command (ii) unlock the encrypted database stored by the computing device with the obfuscated passphrase stored by the computing device, wherein the encrypted database includes a key table to store binary copies of encryption keys and a metadata table to store metadata related to the encryption keys, and (iii) execute the encrypted database command against the encrypted database; and
return a response to the second keystore command in response to execution of the encrypted database command.

11. A computing device for secure certificate management, the computing device comprising:
memory including computer readable instructions; and
a processor to execute the instructions to at least:
obtain a first keystore command to create a keystore; and
generate a random passphrase in response to receipt of the first keystore command, wherein the random passphrase includes a plurality of segments;
obfuscate the random passphrase to generate an obfuscated passphrase stored by the computing device, the processor to:
encode each segment of the plurality of segments of the random passphrase to generate a plurality of encoded segments;
store each encoded segment of the plurality of encoded segments at a corresponding predetermined file system location of the computing device; and obfuscate predetermined file system location data to be used to access the plurality of encoded segments;
in response to obtaining the first keystore command, create an encrypted database, wherein the encrypted database is locked by the random passphrase;
in response to creation of the encrypted database, obtain a second keystore command related to an encryption key;
in response to obtaining the second keystore command, (i) convert the second keystore command into an encrypted database command (ii) unlock the encrypted database stored by the computing device with the obfuscated passphrase stored by the computing device, wherein the encrypted database includes a key table to store binary copies of encryption keys and a metadata table to store metadata related to the encryption keys, and (iii) execute the encrypted database command against the encrypted database; and
return a response to the second keystore command in response to execution of the encrypted database command.

12. A computing device for secure certificate management, the computing device comprising:
memory including computer readable instructions; and
a processor to execute the instructions to at least:
obtain a first keystore command to create a keystore; and
generate a random passphrase in response to receipt of the first keystore command, wherein the random passphrase includes a plurality of segments;
obfuscate the random passphrase to generate an obfuscated passphrase stored by the computing device, the processor to:
encode each segment of the plurality of segments of the random passphrase to generate a plurality of encoded segments; and
store each encoded segment of the plurality of encoded segments at a corresponding predetermined file system location of the computing device, wherein the processor is to set a hidden attribute associated with each of the corresponding predetermined file system locations;
obfuscate predetermined file system location data to be used to access the plurality of encoded segments;
in response to obtaining the first keystore command, create an encrypted database, wherein the encrypted database is locked by the random passphrase;
in response to creation of the encrypted database, obtain a second keystore command related to an encryption key;
in response to obtaining the second keystore command, (i) convert the second keystore command into an encrypted database command (ii) unlock the encrypted database stored by the computing device with the obfuscated passphrase stored by the computing device, wherein the encrypted database includes a key table to store binary copies of encryption keys and a metadata table to store metadata related to the encryption keys, and (iii) execute the encrypted database command against the encrypted database; and
return a response to the second keystore command in response to execution of the encrypted database command.

13. A method for secure certificate management, the method comprising:
obtaining, by a computing device, a keystore command related to an encryption key;
loading, by the computing device, respective encoded passphrase segments of a plurality of encoded passphrase segments from a predetermined file system location of the computing device;
decoding, by the computing device, the plurality of encoded passphrase segments to generate a plurality of passphrase segments;
compounding, by the computing device, the plurality of passphrase segments to generate an obfuscated passphrase;
converting, by the computing device, the keystore command into an encrypted database command;
unlocking, by the computing device, an encrypted database stored by the computing device using the obfuscated passphrase stored by the computing device, wherein the encrypted database includes a key table to store binary copies of encryption keys and a metadata table to store metadata related to the encryption keys;
executing, by the computing device, the encrypted database command against the encrypted database; and
returning, by the computing device, a response to the keystore command in response to executing the encrypted database command.

14. The method of claim 13, wherein:
receiving the keystore command includes receiving a command to insert the encryption key; and
executing the encrypted database command includes (i) inserting the encryption key in the key table of the encrypted database and (ii) inserting metadata related to the encryption key in the metadata table of the encrypted database.

15. The method of claim 13, wherein:
receiving the keystore command includes receiving a command to select the encryption key based on metadata related to the encryption key; and
executing the encrypted database command includes (i) joining the key table and the metadata table of the encrypted database and (ii) selecting the encryption key based on the metadata related to the encryption key.

16. The method of claim 13, wherein:
receiving the keystore command includes receiving a command to delete the encryption key; and
executing the encrypted database command includes (i) deleting the encryption key from the key table of the encrypted database and (ii) deleting metadata related to the encryption key from the metadata table of the encrypted database.

17. The method of claim 13, further including:
receiving, by the computing device, a second keystore command to create a keystore;
generating, by the computing device, a random passphrase, wherein the random passphrase includes a plurality of segments;
obfuscating, by the computing device, the random passphrase to generate the obfuscated passphrase stored by the computing device; and
creating, by the computing device, the encrypted database, wherein the encrypted database is locked by the random passphrase;
wherein receiving the keystore command includes receiving the keystore command in response to creating the encrypted database.

18. A non-transitory computer readable storage medium including a plurality of instructions that in response to being executed cause a computing device to:
- obtain a keystore command related to an encryption key;
- load respective encoded passphrase segments of a plurality of encoded passphrase segments from a predetermined file system location of the computing device;
- decode the plurality of encoded passphrase segments to generate a plurality of passphrase segments;
- compound the plurality of passphrase segments to generate an obfuscated passphrase;
- convert the keystore command into an encrypted database command;
- unlock an encrypted database stored by the computing device using the obfuscated passphrase stored by the computing device, wherein the encrypted database includes a key table to store binary copies of encryption keys and a metadata table to store metadata related to the encryption keys;
- execute the encrypted database command against the encrypted database; and
- return a response to the keystore command in response to executing the encrypted database command.

19. The non-transitory computer readable storage medium of claim 18, further comprising a plurality of instructions that in response to being executed cause the computing device to:
- receive a second keystore command to create a keystore;
- generate a random passphrase, wherein the random passphrase includes a plurality of segments;
- obfuscate the random passphrase to generate the obfuscated passphrase stored by the computing device; and
- create the encrypted database, wherein the encrypted database is locked by the random passphrase;
- wherein to receive the keystore command includes to receive the keystore command in response to creating the encrypted database.

20. A non-transitory computer readable storage medium comprising a plurality of instructions that in response to being executed cause a computing device to:
- obtain a keystore command related to an encryption key, the keystore command including a command to insert the encryption key;
- convert the keystore command into an encrypted database command;
- unlock an encrypted database stored by the computing device using an obfuscated passphrase stored by the computing device, wherein the encrypted database includes a key table to store binary copies of encryption keys and a metadata table to store metadata related to the encryption keys;
- execute the encrypted database command against the encrypted database by (i) inserting the encryption key in the key table of the encrypted database and (ii) inserting metadata related to the encryption key in the metadata table of the encrypted database; and
- return a response to the keystore command in response to executing the encrypted database command.

21. A non-transitory computer readable storage medium comprising a plurality of instructions that in response to being executed cause a computing device to:
- obtain a keystore command related to an encryption key, the keystore command including a command to select the encryption key based on metadata related to the encryption key;
- convert the keystore command into an encrypted database command;
- unlock an encrypted database stored by the computing device using an obfuscated passphrase stored by the computing device, wherein the encrypted database includes a key table to store binary copies of encryption keys and a metadata table to store metadata related to the encryption keys;
- execute the encrypted database command against the encrypted database by (i) joining the key table and the metadata table of the encrypted database and (ii) selecting the encryption key based on the metadata related to the encryption key; and
- return a response to the keystore command in response to executing the encrypted database command.

22. A non-transitory computer readable storage medium comprising a plurality of instructions that in response to being executed cause a computing device to:
- obtain a keystore command related to an encryption key, the keystore command including a command to delete the encryption key;
- convert the keystore command into an encrypted database command;
- unlock an encrypted database stored by the computing device using an obfuscated passphrase stored by the computing device, wherein the encrypted database includes a key table to store binary copies of encryption keys and a metadata table to store metadata related to the encryption keys;
- execute the encrypted database command against the encrypted database by (i) deleting the encryption key from the key table of the encrypted database and (ii) deleting metadata related to the encryption key from the metadata table of the encrypted database; and
- return a response to the keystore command in response to executing the encrypted database command.

* * * * *